United States Patent
Kim et al.

(10) Patent No.: US 7,336,326 B2
(45) Date of Patent: Feb. 26, 2008

(54) IMAGE DISPLAYING UNIT OF A 3D IMAGE SYSTEM HAVING MULTI-VIEWPOINTS CAPABLE OF DISPLAYING 2D AND 3D IMAGES SELECTIVELY

(75) Inventors: Sung-sik Kim, Seoul (KR); Jung-young Son, Suwon-si (KR); Chang-wan Hong, Yongin-si (KR); Tac-hong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 10/900,186

(22) Filed: Jul. 28, 2004

(65) Prior Publication Data
US 2005/0062905 A1 Mar. 24, 2005

(30) Foreign Application Priority Data
Jul. 28, 2003 (KR) .................... 10-2003-0052083

(51) Int. Cl.
*G02F 1/1335* (2006.01)
*G02F 1/1333* (2006.01)
*G02B 21/22* (2006.01)

(52) U.S. Cl. .................... 349/95; 349/122; 359/464
(58) Field of Classification Search ............. 349/95, 349/122; 359/464, 465, 462
See application file for complete search history.

(56) References Cited
U.S. PATENT DOCUMENTS 5,831,765 A * 11/1998 Nakayama et al. ......... 359/464
5,897,184 A * 4/1999 Eichenlaub et al. ......... 349/64
6,061,179 A    5/2000 Inoguchi et al.
6,137,456 A   10/2000 Bhagavatula et al.

(Continued)

FOREIGN PATENT DOCUMENTS

JP    10-221644    8/1998

(Continued)

OTHER PUBLICATIONS

An Office Action dated May 12, 2005 of the Korean Patent Application No. 2003-52083 (listing 2 references).

(Continued)

*Primary Examiner*—Toan Ton
(74) *Attorney, Agent, or Firm*—Stanzione & Kim, LLP (57) ABSTRACT

A 3D image displaying unit in which 2D and 3D images are interchangeable. The 3D image displaying unit includes an image display panel which displays 2D or 3D images, and an optical plate which is provided behind the image display panel and refracts an incident light to the image display panel. Also, the 3D image displaying unit includes a first flat display device which displays a multi-viewpoint image in a case where the 3D image is displayed, and is transparent in a case where the 2D image is displayed, an optical plate which refracts lights that are incident from the first flat display device and provides parallax in a predetermined direction, and a display unit which provides the lights that pass through the optical plate with a parallax in the vertical direction to a parallax provided by the optical plate in the case where the 3D image is displayed, and displays the corresponding 2D image in the case where the 2D image is displayed.

21 Claims, 8 Drawing Sheets

U.S. PATENT DOCUMENTS

| | | |
|---|---|---|
| 6,307,585 B1 | 10/2001 | Hentschke |
| 6,437,915 B2 * | 8/2002 | Moseley et al. ............ 359/465 |
| 2003/0020883 A1 * | 1/2003 | Hara ......................... 353/31 |

FOREIGN PATENT DOCUMENTS

| | | |
|---|---|---|
| JP | 10-268805 | 10/1998 |
| JP | 2000-102038 | 4/2000 |
| JP | 2002-318369 | 10/2002 |
| KR | 2001-0098308 | 11/2001 |
| KR | 1020030022581 | 3/2003 |
| WO | WO 01/20386 | 3/2001 |

OTHER PUBLICATIONS

Office Action dated Mar. 10, 2006 of Chinese Patent Application No. 200410083272.9.

* cited by examiner

IMAGE DISPLAYING UNIT OF A 3D IMAGE SYSTEM HAVING MULTI-VIEWPOINTS CAPABLE OF DISPLAYING 2D AND 3D IMAGES SELECTIVELY

CROSS-REFERENCE TO RELATED APPLICATIONS

This application claims the priority of Korean Patent Application No. 2003-52083, filed on Jul. 28, 2003, in the Korean Intellectual Property Office, the disclosure of which is incorporated herein in its entirety by reference.

BACKGROUND OF THE INVENTION

1. Field of the Invention

The present general inventive concept relates to a 3D image display system, and more particularly, to an image displaying unit of a 3D image system having multi-viewpoints, in which 2D and 3D images are interchangeable.

2. Description of the Related Art

A three-dimensional (3D) display can be classified according to a 3D display method, viewpoints, view conditions, observation conditions, whether or not an observer wears supplementary glasses, and the like. Binocular parallax is widely used to allow observers to recognize displayed images stereoscopically. If an observer's eyes receive images that are observed from various angles, the observer can perceive a sense of space through the observer's brain operation. A method of displaying a 3D image is generally classified into stereoscopic display and volumetric display based on recognition of stereoscopic vision.

In the stereoscopic display, two pieces of a two-dimensional (2D) image having binocular parallax are provided to right and left eyes, thereby recognizing whole images stereoscopically. In the stereoscopic display, since right and left images that are taken from the two eyes are displayed, the stereoscopic display has a disadvantage in that 3D images are recognized only from a single direction.

In the volumetric display, stereoscopic images in which an object is taken in various directions are displayed. Thus, the volumetric display has an advantage in that 3D images are recognized from various directions.

A multocular image displaying method, which is one of 3D image display methods, is a technique of displaying binocular parallax images that are taken in various directions, and includes a parallax panoramagram method, a lenticular method, an integral photography or volumetric-graph (IP) method, and a slit scan method.

Among these methods, the IP method does not require additional glasses for observation. Also, the IP method is very useful to create 3D video because it can obtain stereoscopic video automatically in desired positions. A display using the IP method includes a micro lens array or a pinhole array and is widely used in many applications, such as medical science, engineering, and simulation.

Figure 1:
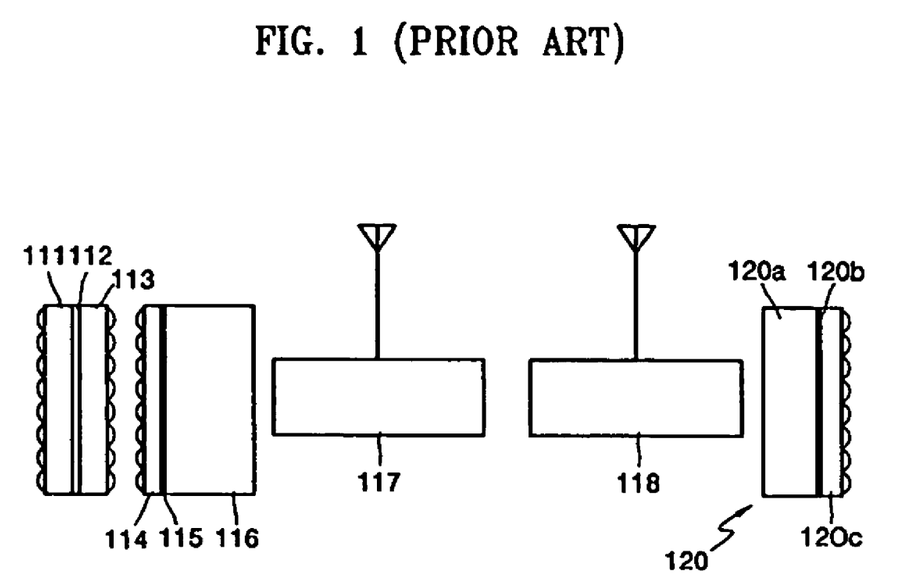
FIG. 1 is a sectional view of a conventional 3D image system.

FIG. 1 is a schematic view of a conventional 3D image system (hereinafter, referred to as a conventional system) using IP method.

Referring to FIG. 1, the conventional system includes first to third micro lens arrays 111, 113 and 114 and a TV pickup tube 116. The micro lens arrays convert an image taken by a camera into a 3D video signal. An optical diffusion layer 112 is interposed between the first and second micro lens arrays 111 and 113 and is attached therebetween. The second and third micro lens arrays 113 and 114 are spaced apart from each other by a predetermined distance. The first to third micro lens arrays 111, 113 and 114 are fly eye lenses. A photo-sensitive layer 115 is interposed between the third micro lens array 114 and the TV pickup tube 116.

The 3D video signal passing through the first to third micro lens arrays 111, 113 and 114 and the TV pickup tube 116 is transmitted to a receiving unit 118 through a transmitting unit 117. The 3D video signal transmitted from the transmitting unit 117 is received by the receiving unit 118 is then transmitted to a display unit 120. The display unit 120 is configured to display the transmitted 3D video signal. The display unit 120 includes a display 120a, a fluorescent screen 120b, and a fourth micro lens array 120c attached to the fluorescent screen 120b. The fluorescent screen 120b is interposed between the display 120a and the fourth micro lens array 120c and is attached therebetween. The fluorescent screen 120b displays an image corresponding to the 3D video signal. A viewer stereoscopically views the displayed image through the fourth micro lens array 120c. The image that is formed on the fluorescent screen 120b is identical to the image that is formed on a photosensitive layer 115 of the TV pickup tube 116 through the first to third micro lens arrays 111, 113 and 114. The fourth micro lens array 120c has the same structure as the third micro lens array 114. Relation of the display 120a to the fourth micro lens array 120c is identical to that of the TV pickup tube 116 to the third micro lens array 114. Thus, viewing the image that is displayed on the fluorescent screen 120b in front of the fourth micro lens array 120c, a viewer recognizes virtual stereoscopic video of an actual object.

Meanwhile, simulation or medical analysis systems require a 2D image as well as a 3D image.

The above-described conventional system, however, is exclusively used for 3D image implementation, so that selective implementation of 2D and 3D images is impossible. Accordingly, application of the conventional system is very limited.

Also, the micro lens array provides vertical and horizontal parallax at the same time and displays volumetric images, but must record a whole image of an object on one micro lens. Therefore, it is necessary to develop a display device that can display a whole image of an object on an area corresponding to a diameter of the micro lens in standard resolution. However, it is difficult to make the micro lens array having a high resolution.

Further, image discontinuity may be caused due to a gap between micro lenses.

Furthermore, distortion or deflection may occur at boundaries that are formed between micro lenses, causing ghost images in which 3D images overlap with each other in 3D image implementation.

SUMMARY OF THE INVENTION

The present general inventive concept provides a 3D image displaying unit in which an existing 2D image display system is used and, if necessary, 2D and 3D images can be displayed.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a 3D image displaying unit in which 2D and 3D images are interchangeable, the 3D image displaying may include an image display panel which displays 2D or 3D images to a viewer; and an optical plate which is provided behind the image display panel and refracts an incident light to the image display panel.

The 3D image displaying unit may further include a parallax barrier plate which is arranged between the image display panel and the optical plate in order to prevent an image of the optical plate from being displayed on the image display panel. The parallax barrier plate is in contact with the optical plate.

The optical plate may be rotated by a predetermined angle.

The image display panel may be positioned in a virtual surface that includes points in which lights that pass through focuses of the optical plate and are diverged, are intersected with each other for the first time.

The parallax barrier plate may be provided at a position in which lights that are incident to the optical plate are converged.

The image display panel may be a flat display panel.

The optical plate may be two lenticular plates or a micro lens array. The two lenticular plates are in contact with each other and lenses of the lenticular plates are intersected perpendicular to each other.

The parallax barrier plate may be an LCD panel, a grid array plate, or a pinhole array plate. The LCD panel is transparent only at an area in which the lights are converged.

The foregoing and/or other aspects and advantages of the present general inventive concept may also be achieved by providing a 3D image displaying unit in which 2D and 3D images are interchangeable. The 3D image displaying unit may include a first flat display device which displays a multi-viewpoint image in a case where the 3D image is displayed, and is transparent in case where the 2D image is displayed, an optical plate which refracts lights that are incident from the first flat display device and provides parallax in a predetermined direction, and a display unit which provides a parallax vertical to a parallax provided by the optical plate with the lights that pass through the optical plate in a case that the 3D image is displayed, and displays a corresponding 2D image in a case that the 2D image is displayed.

The first flat display device may be an LCD panel that may include first and second polarizers and a liquid crystal layer provided between the first and second polarizers. Polarization status of the first and second polarizers is opposite to each other.

The optical plate is a lenticular plate.

The display unit is a second flat display device. The display unit may be an LCD panel that includes third and fourth polarizers and a liquid crystal layer provided between the third and fourth polarizers. Polarization status of the third and fourth polarizers is equal to each other.

The display unit may be an LCD panel that is attached to the optical plate. The LCD panel may include a liquid crystal layer and a polarizer having a polarization status equal to the first polarizers at a light emitting surface.

The display unit may be an LCD panel that includes two polarizers and a liquid crystal layer. The two polarizers have a polarization status equal to each other.

The present general inventive concept can selectively display 2D and 3D images using the 2D image display system. Also, the present general inventive concept can resolve the conventional problem that displays an image of a specific optical plate used in the 3D image display. Accordingly, the present general inventive concept can be applied to various kinds of image display devices that are necessary to display 2D and 3D images selectively.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

The present general inventive concept will now be described more fully with reference to the accompanying drawings, in which exemplary embodiments of the general inventive concept are shown. The invention may, however, be embodied in many different forms and should not be construed as being limited to the embodiments set forth herein; rather, these embodiments are provided so that this disclosure will be thorough and complete, and will fully convey the concept of the general inventive concept to those skilled in the art. In the drawings, the thickness of layers and regions are exaggerated for clarity. Like reference numerals in the drawings denote like elements, and thus their description will be omitted.

The present general inventive concept provides an image display unit to realize a multi-viewpoint 3D image system that can selectively display two images, that is, can interchange a 2D image with a 3D image, and vice versa, by using a directional illuminating light, one or two image display panels, an IP plate, a lenticular plate, or a parallax barrier plate.

A 3D image system is a next-generation image system which will be substituted for an existing 2D image system.

At present, most of users use 2D image systems, and therefore, there is little probability that the 3D image system having no compatibility with the 2D image system will be put to practical use.

In view of the compatibility of 2D and 3D images, the 3D image system must be able to use members of the 2D image system, for example, a photographing system and an image display panel. The 3D image system must be able to use a 2D image transmitting method as is. Also, the image display panel itself must be able to display a 2D image in a 3D image form, and vice versa.

In such compatibility, the most preferable 3D imaging method is a multi-viewpoint imaging method that displays a 3D image through formation of a viewing zone using special optical plates.

In a case of a horizontal-parallax multi-viewpoint 3D image system that uses an LCD panel as a parallax barrier plate, a parallax barrier plate is used as a 2D image display panel and an original display screen, which displays a multi-viewpoint, is used as an illuminating light source plate for the compatibility between 2D and 3D images. In a case that single-viewpoint images instead of the multi-viewpoint images are displayed repeatedly, a 2D image can be displayed, while resolution is somewhat reduced.

Meanwhile, a full parallax method that provides right, left, vertical and horizontal parallaxes is not different from the horizontal parallax method. The full parallax method, however, must provide parallaxes in a right and left direction as well as a vertical and horizontal direction. Therefore, instead of the parallax barrier plate, a 2D pinhole array plate is used. The 2D pinhole array plate can be made of an LCD. Accordingly, the 2D pinhole array plate also can be used as an image display panel. In this case, however, a small amount of an illuminating light passes through the pinhole, and thus, a 3D image becomes dark. For this reason, a very bright illuminating light is necessary when an LCD is used instead of the 2D pinhole array plate.

The full parallax method can use a micro lens array or two lenticular plates perpendicular to each other. In this case, a 3D image can be interchanged with a 2D image by displaying repeatedly the single-viewpoint image. However, resolution of the image display panel may be degraded and a visual effect may be deteriorated due to the presence of these plates. However, this problem can be resolved by positioning the parallax barrier plate between the image display panel and the micro lens array or the two lenticular plates perpendicular to each other.

In order to realize the image displaying unit having compatibility between 2D and 3D images, the present general inventive concept provides an image displaying unit, in which a lenticular plate, a parallax barrier plate or an IP plate, and parallel light or quasi-parallel directional illuminating light are combined.

In a case of a multi-viewpoint 3D image system that uses a flat display panel, a specific optical plate to form a viewing zone is arranged in contact with a front of a flat display panel. Also, equally positioned pixel lines for multi-viewpoint images to be displayed on one pitch are arranged equal to relative positions of a camera corresponding to the respective multi-viewpoint images. In a case of a full parallax image, equally positioned pixels of one micro lens are collected and arranged equal to relative positions of the camera within one pixel cell. By doing so, pixels arranged in the pixel lines within the respective pitches or the pixel cells within the respective micro lenses are divided according to the viewpoints, and thus can be viewed in the viewing zone.

In order for the compatibility between 2D and 3D images, the image display panel must be opposite to the viewer so that degradation of the resolution due to the specific optical plate can be prevented. Accordingly, it is preferable to provide the specific optical plate behind the image display panel. In this manner, the 2D image is displayed on the image display panel as it is, and the multi-viewpoint images are arranged by pixel cell unit in order to display the 3D image.

Like general 3D image systems, even when the specific optical plate is provided behind the image display panel, multi-viewpoint images that are divided by pixel cell units need to be separated according to the viewpoints by transferring the images of the image display panel corresponding to each pitch of the specific optical plate in a predetermined direction. Thus, it is preferable that a parallel light or a quasi-parallel light, instead of a diffused light, is used as the illuminating light.

The position of the image display panel may be changed according to the kind and position of the specific optical plate.

Figure 2:
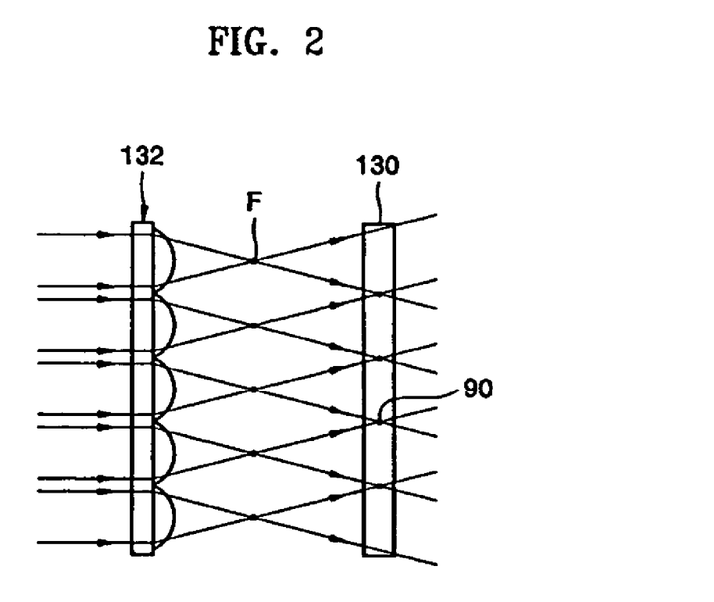
FIGS. 2 through 4 are plan views of a multi-viewpoint 3D image displaying unit according to an embodiment of the present general inventive concept, in which 2D and 3D images are interchangeable.

For example, as shown in FIG. 2, in a case that the specific optical plate is a micro lens array, it is an aspect of the present general inventive concept to dispose the image display panel 130 at a position that includes points 90, in which lights that are converged at a focus F of the micro lens array 132 are diverged and then meet for the first time as diverged lights.

Figure 3:
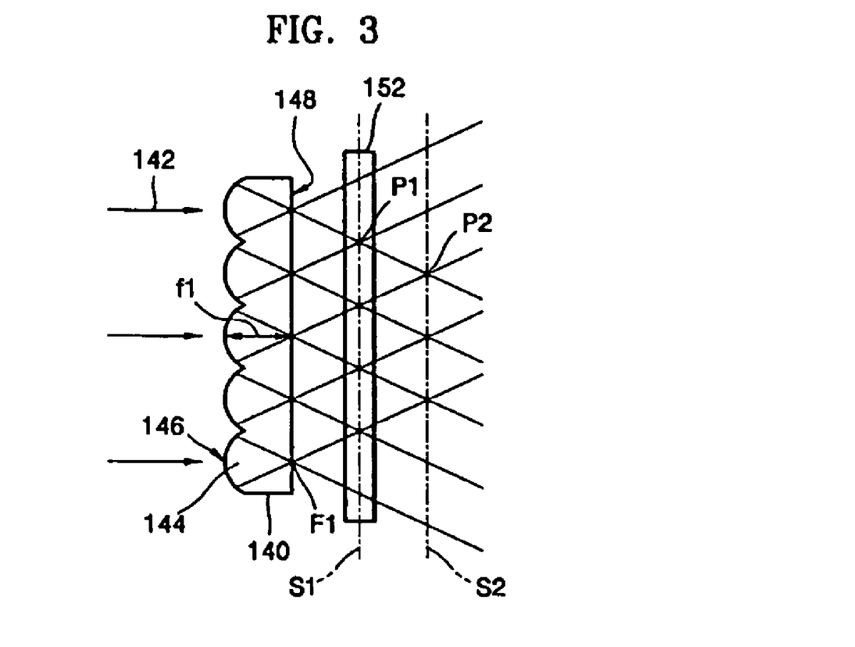
Figure 4:
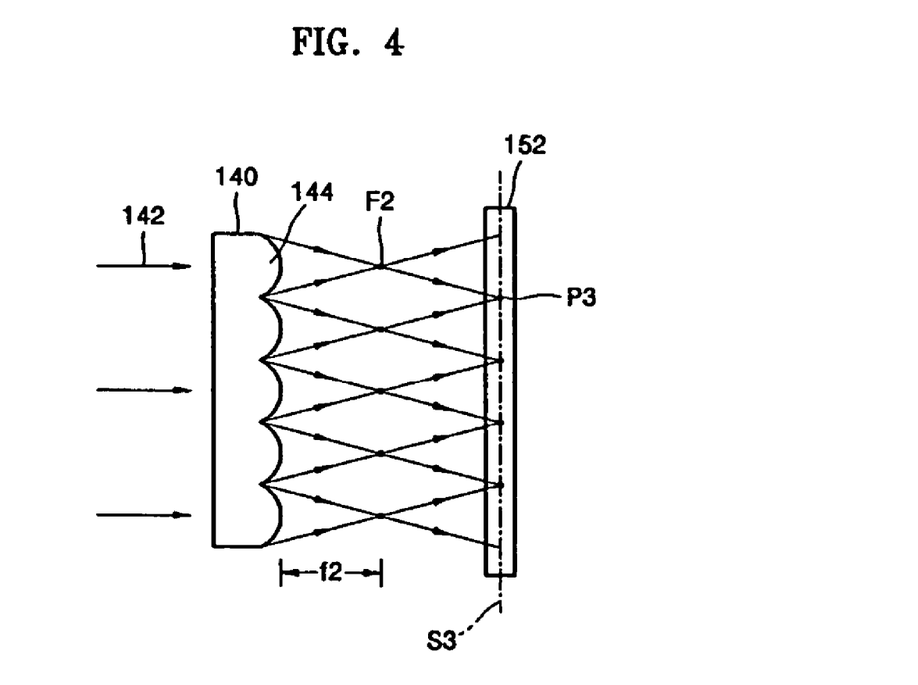

As shown in FIGS. 3 and 4, in a case that the specific optical plate that is arranged behind the image display panel is a lenticular plate, the position of the image display panel is changed depending on which side of the specific optical plate a light is incident thereon.

FIG. 3 illustrates a case where a lens direction of a first lenticular plate 140 is facing away from the side at which the parallel lights 142 are approaching the lens.

Referring to FIG. 3, in the case where parallel lights 142 are incident to a lens surface of the first lenticular plate 140, if a first focal distance f1 of each lens 144 that constitutes a lens surface, that is, a distance between a vertex 146 of each lens 144 and a rear surface 148 of the first lenticular plate 140, that is, a surface to which the parallel lights 142 are emitted is equal to each other, the parallel lights 142 are refracted by each lens 144 and converged at first focuses F1, which is present on the rear surface 148 of the first lenticular plate 140. Since the parallel lights 142 converge at the first focuses F1, the parallel lights 142 are incident to the first lenticular plate 140 and as many light spots as there are lenses 144, which constitute the first lenticular plate 140, are present on the rear surface 148 of the first lenticular plate 140. The lights that converge at the first focuses F1 of the first lenticular plate 140 pass through the first focuses F1 and diverge again. The diverged lights intersect with each other. A first surface position (or plane) S1 that includes first positions P1, where the diverged lights intersect for the first time, and a second surface position (or plane) S2 that includes second positions P2, where the diverged lights intersect for a second time, are parallel to the rear surface 148 of the first lenticular plate 140. In a case where an image display panel 152 is arranged at the first surface S1, the whole image display panel 152 is seen in a zone, which is formed by innermost boundary lines among boundary lines of the diverged lights. Thus, this zone becomes a viewing zone.

FIG. 4 illustrates a case where the parallel lights 142 are incident on the lenticular plate 140 through the rear face 148 of the first lenticular plate 140.

Referring to FIG. 4, considering the arrangement of the first lenticular plate 140, a case where the parallel lights 142 are incident to the first lenticular plate 140 is similar to a case where the parallel lights 142 are incident to a planar-convex lens. Accordingly, the parallel lights 142 that are incident to the first lenticular plate 140 converge at second focuses F2, which are spaced apart from the vertex 146 of each lens 144 by a second focal distance f2. The lights that converge at the second focuses F2 diverge again after passing through the second focuses F2. It is an aspect of the general inventive concept to arrange the image display panel 152 at a third surface position (or plane) S3 that includes third points P3, where the lights that diverge from the second focuses F2 intersect for the first time.

In a case of the image displaying units shown in FIGS. 3 and 4, an image of the first lenticular plate 140 is displayed through the image display panel 152 together with an original display image at the same time. In this case, the original display image may be degraded in quality. Therefore, a predetermined means can be provided in the image displaying units of FIGS. 3 and 4, so that the image of the first lenticular plate 140 cannot be seen. It is an aspect of the general inventive concept to provide the predetermined means between the image display panel 152 and the first lenticular plate 140.

The predetermined means may be positioned at a surface (plane) that includes the focuses of the first lenticular plate 140. It is an aspect of the general inventive concept that the predetermined means is a plate that can transmit the lights which pass through the focuses of the first lenticular plate 140 and can shield the lights which pass through the other points except for the focuses.

Thus, the position of the predetermined means to be provided in the image displaying unit of FIGS. 3 and 4 may be changed.

Figure 5:
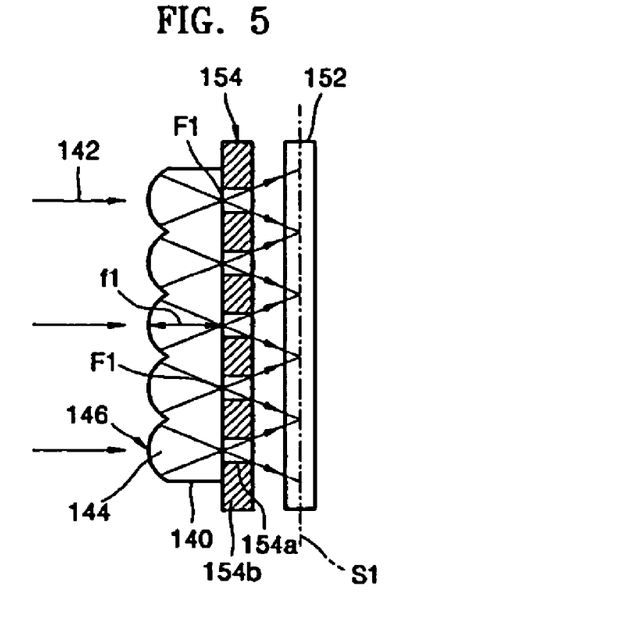
FIGS. 5 and 6 are plan views of a case where a first optical plate that transmits an incident light only at some regions is provided in the 3D image displaying unit of FIGS. 3 and 4.
Figure 6:
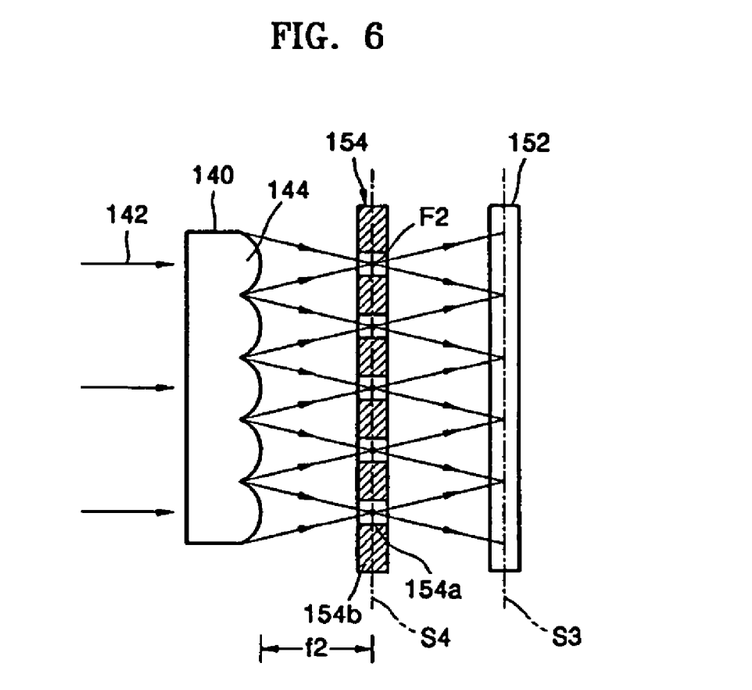

FIG. 5 illustrates a case where the predetermined means is provided in the image displaying unit of FIG. 3, and FIG. 6 illustrates a case where the predetermined means is provided in the image displaying unit of FIG. 4.

Referring to FIG. 5, a first optical plate 154 can be used as the predetermined means that transmits some of the incident lights and shields some of the incident lights, and is illustrated as being provided on the rear surface 148 of the first lenticular plate 140. The first optical plate 154 transmits the lights that pass through the first focuses F1 of the first lenticular plate 140 and shields the lights that are incident to areas except for the first focuses F1. For this purpose, a plurality of light transmitting areas 154a corresponding to the first focuses F1 may be provided in the first optical plate 154. The remaining areas 154b except for the light transmitting areas 154a of the first optical plate may be light shielding areas.

In the case where the rear surface 148 of the first lenticular plate 140 is opposite to the parallel light 142, as illustrated in FIG. 4, the second focuses F2 of each lense 144 constituting the first lenticular plate 140 are illustrated as being spaced apart from the lens surface of the first lenticular plate 140 by the second focal distance. Therefore, as shown in FIG. 6, it is an aspect of the general inventive concept to provide the first optical plate 154 at a fourth surface (or plane) S4 that includes the second focuses F2 between the first lenticular plate 140 and the image display panel 152. In this case, it is preferable that the light transmitting areas 154a are formed at the positions of the second focuses F2.

In a case where the first optical plate 154 provides the parallax in only one direction, that is, in a case where the light transmitting areas 154a of the first optical plate 154 are formed in a slit shape, the first optical plate 154 is equal to the above-described parallax barrier plate. However, in case where the first optical plate 154 provides the parallax in horizontal and vertical directions, that is, in case where the first optical plate 154 provides the full parallax, the first optical plate 154 may be equal to the 2D pinhole array plate or grid array plate.

Figure 7:
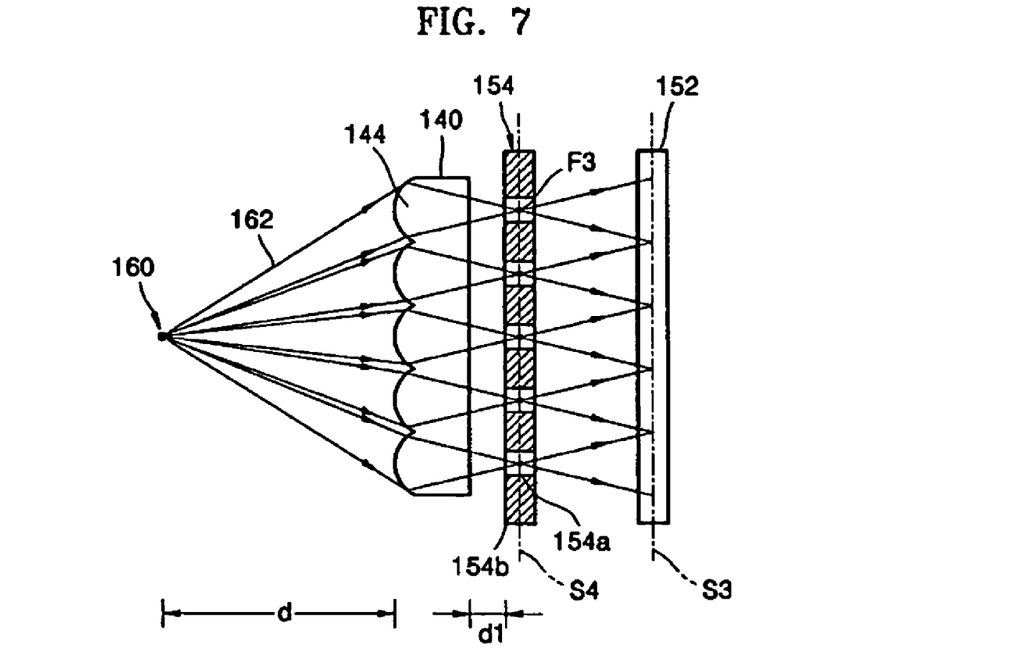
FIG. 7 is a plan view of a case where a diffused light irradiated by a point light source is incident to the 3D image displaying unit of FIG. 3.

FIG. 7 illustrates relative positions of the lenticular plate 140 and the image display panel 152, in a case where a point light source instead of the parallel light is used as an illuminating light.

Referring to FIG. 7, a point light source 160 is provided spaced apart from the first lenticular plate 140 by a predetermined distance d. With respect to the lights 162 that are irradiated from the point light source 160, third focuses F3 of the lenses 144 are formed spaced apart from the rear surface 148 of the first lenticular plate 140 by a predetermined distance d1. Accordingly, in the case where the point light source 160 is used as the illuminating light, it is an aspect of the general inventive concept that the light transmitting areas 154a of the first optical plate 154 are formed at the positions of the third focuses F3. The image display panel 152 is arranged at the position where the lights that diverge through the third focuses F3 intersect with each other for the first time.

In the image displaying units of FIGS. 3 and 4, the images can be displayed in the full parallax method by intersecting, for example, perpendicularly intersecting, lens surfaces of two lenticular plates having the same optical characteristic. This will be described later.

Since the image displaying units of FIGS. 3 and 4 have one viewing zone, pseudoscopic areas where depth sense is reversed are not present, but the viewing zone is formed far away from the image display panel 152. Accordingly, it may be inconvenient when several persons view the display images.

This inconvenience can be settled by obliquely irradiating the parallel lights 142 to the first lenticular plate 140. That is, in the case that the parallel lights 142 are incident to the first lenticular plate 140 at a predetermined incident angle, the focuses of the lenses 144 are moved proportionally to the incident angle of the parallel lights 142 toward the lenses 144. Accordingly, the oblique incident angle (or incident angle) of the parallel lights 142 can be controlled so that a focus of one of the lenses 144 is positioned at a center of the adjacent lens. In this manner, it is possible to obtain a viewing zone adjacent to a viewing zone that is provided by the parallel lights 142.

In the case where the point light source is used as the illuminating light, several viewing zones can also be formed by irradiating the point light source in various directions.

An image displaying unit in which a 2D image and a full-parallax 3D image are interchangeable using a directional illuminating light will be described below.

Figure 8:
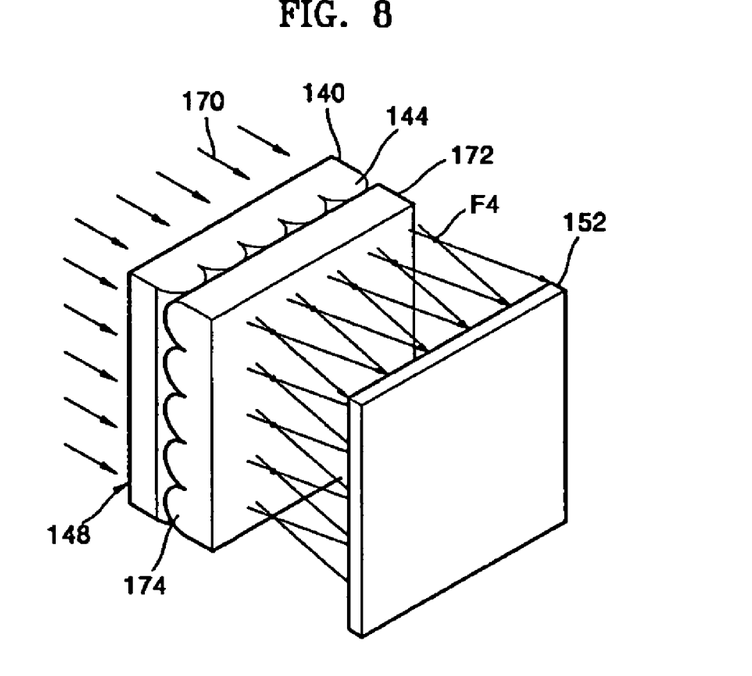
FIG. 8 is a plan view of a case where the lenticular plate of FIG. 3 is replaced with an intersection lenticular plate.

Referring to FIG. 8, the image displaying unit includes a first lenticular plate 140, a second lenticular plate 172, and an image display panel 152. A directional illuminating light 170 is incident to a rear surface 148 of the first lenticular plate 140. A lens surface of the second lenticular plate 172 is in contact with the first lenticular plate 140. It is an aspect of the general inventive concept that lenses 144 and 174 of the first and second lenticular plates 140 and 172 have the same physical properties, for example, material, curvature, focal distance, width, and the like. Accordingly, the first and second lenticular plates 140 and 174 show the same optical characteristic, except for different arrangement direction of the lenses. It is an aspect of the general inventive concept that the lenses 144 of the first lenticular plate 140 are arranged perpendicular to the lenses 174 of the second lenticular plate 172.

In the image displaying unit of FIG. 8, the lenses 144 of the first lenticular plate 140 can be arranged in a horizontal direction while the lenses 174 of the second lenticular plate 172 are arranged in a vertical direction, and vice versa.

The case where the first and second lenticular plates 140 and 172 intersect with each other is similar to a case where square-shaped lenses having the same width and length as the lenses of the first or second lenticular plate 140 or 172 are in contact with each other. Thus, the directional illuminating lights 170 form fourth focuses F4 at a rear surface of the second lenticular plate 172 or a position spaced a distance apart from the rear surface of the second lenticular plate 172. The directional illuminating lights 170 pass through the fourth focuses F4 and diverge. The image display panel 152 is provided at a surface (not shown) that includes points where the diverging lights intersect with each other for the first time.

Figure 9:
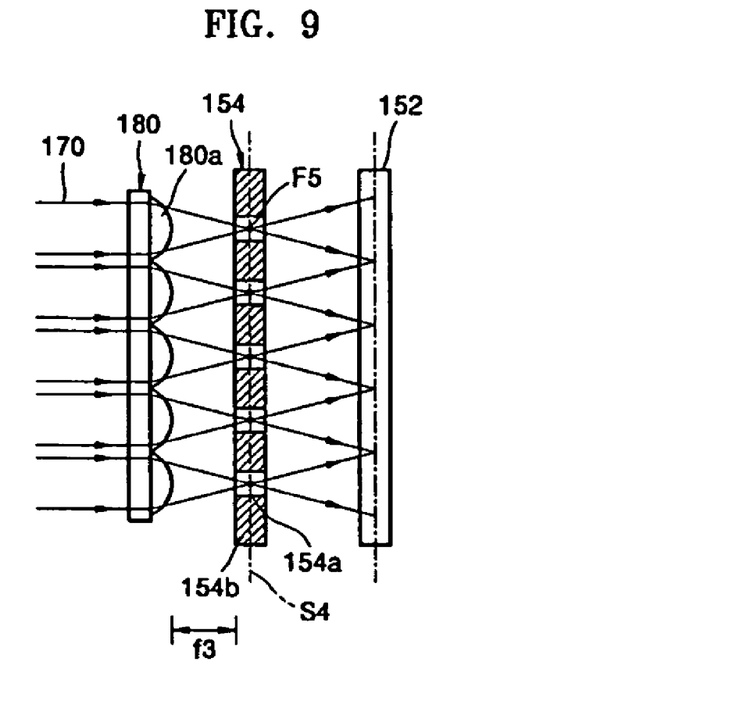
FIG. 9 is a plan view of a case where the lenticular plate of FIG. 3 is replaced with a micro lens array and a first optical plate is provided in a focus of a micro lens array.

FIG. 9 illustrates a case where a micro lens array is used instead of the first and second lenticular plates 140 and 172.

Referring to FIG. 9, this case is similar to the case of the first and second lenticular plates 140 and 172, except that fifth focuses F5 of the directional illuminating lights 170 are formed at positions that are spaced apart from a micro lens array 180 by a third focal distance f3 of each micro lens 180*a*.

In FIGS. 8 and 9, in order to prevent the first and second lenticular plates 140 and 172 and the micro lens arrays 180 from being displayed on the image display panel 152, an optical plate that performs the same function as the first optical plate 154 can be provided at a surface that includes the fourth focuses F4 and a surface that includes the fifth focuses F5.

Meanwhile, in order to form a plurality of viewing zones, it is possible to change an incident angle of the lights that are incident to the optical plate formed of the first and second lenticular plates 140 and 172 or the micro lens array 180 using a plurality of illuminating lights.

For example, the first and second lenticular plates 140 and 172 can be rotated in the intersected status by a predetermined angle. At this time, the lights that are incident to the first and second lenticular plates 140 and 172, that is, the images, are rotated at the same angle and in the same direction and are incident to the intersected lenticular plates. The case where the micro lens array 180 is used instead of the first and second lenticular plates 140 and 172 is performed in a similar fashion.

Figure 10:
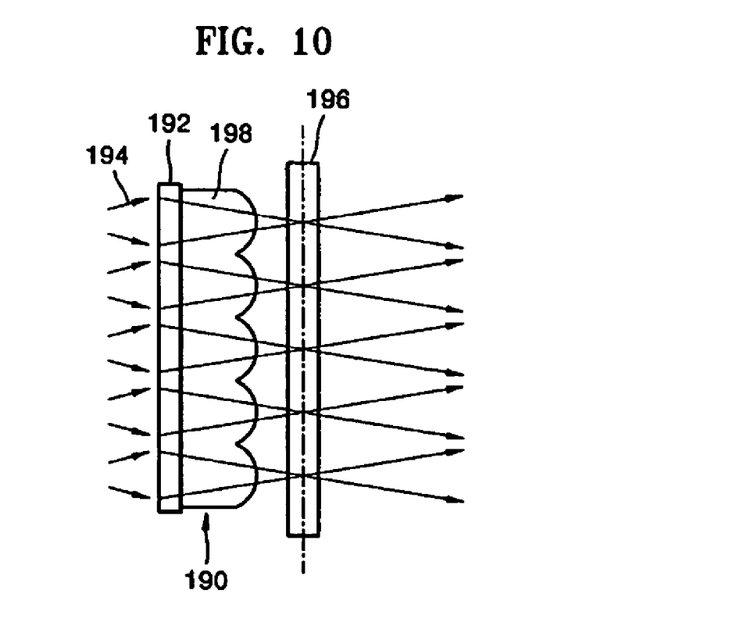
FIG. 10 is a plan view of a multi-viewpoint 3D image displaying unit according to another embodiment of the present general inventive concept, in which 2D and 3D images are interchangeable.

FIG. 10 is a plan view of an image displaying unit according to another embodiment of the present general inventive concept. Lights that are generated from an LCD backlight are used as the illuminating light, and a 2D image and a full-parallax 3D image are selectively realized using both of the lenticular plate and the parallax barrier plate.

Referring to FIG. 10, an image display panel 192 is in contact with a rear surface of a third lenticular plate 190. The image display panel 192 is a flat display panel, for example, an LCD panel (hereinafter, referred to as first LCD panel). Diffused lights 194 are irradiated to the image display panel 192. The diffused lights 194 are generated from the LCD backlight. A parallax barrier plate 196 is positioned adjacent to lens surfaces of each of plural lenses 198 that together constitute the third lenticular plate 190. Parallax of the parallax barrier plate 196 is different according to which parallax the third lenticular plate 190 has.

For example, if the third lenticular plate 190 provides a horizontal parallax, it is preferable that the parallax barrier plate 196 has a vertical parallax. If the third lenticular plate 190 provides a vertical parallax, it is preferable that the parallax barrier plate 196 has a horizontal parallax.

Figure 11:
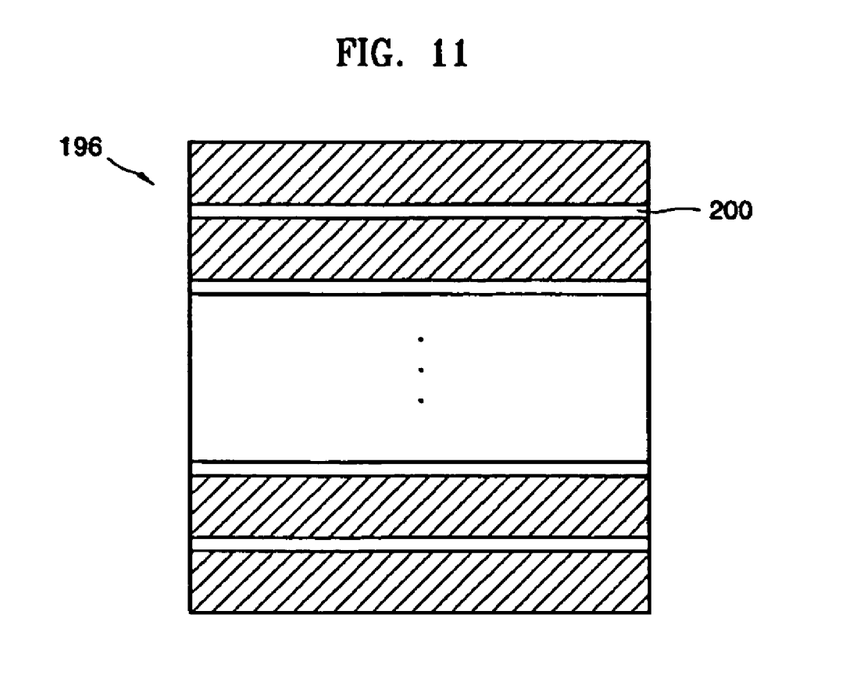
FIG. 11 is a front view of a case where a first slit is formed in the parallax barrier plate (LCD panel) of FIG. 10.

Referring to FIG. 11, in the case where the third lenticular plate 190 provides the horizontal parallax, the parallax barrier plate 196 is configured to have first slits 200 that are formed in parallel in a horizontal direction and spaced apart from each other by a predetermined distance.

Figure 12:
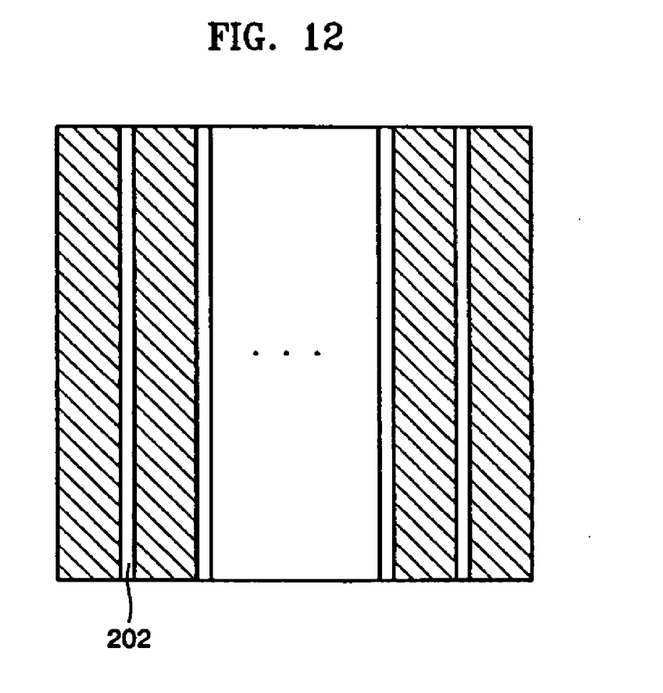
FIG. 12 is a front view of a case where a second slit is formed in the parallax plate (LCD panel) of FIG. 10.

Referring to FIG. 12, in the case where the third lenticular plate 190 provides the vertical parallax, the parallax barrier plate 196 is configured to have second slits 202 that are formed in parallel with each other in a vertical direction and spaced apart from each other by a predetermined distance in a horizontal direction, thereby providing the horizontal parallax.

In FIG. 10, the parallax barrier plate 196 can be formed of a thin glass plate having a uniform thickness in order to display a 3D image having a full parallax. Also, in order for compatibility of 2D and 3D images, it is an aspect of the general inventive concept that an additional flat display device, for example, a second LCD panel, may be used instead of the thin glass plate.

In the case where the second LCD panel is used as the parallax barrier plate 196, a multi-viewpoint image is displayed on the first LCD panel 192 that is in contact with the rear surface of the third lenticular plate 190, and the parallax barrier plate 196 is used as the original parallax barrier.

In order to display the 2D image, the first LCD panel 192 is completely transparent, and the 2D image is displayed on the parallax barrier plate 196.

In this configuration, two LCD panels are required in order to display a full-parallax 3D image, which is interchangeable between the 2D image and the 3D image.

A general LCD panel includes two polarizers that have a phase difference of 90° to 270°, and a liquid crystal layer that is provided therebetween. If a predetermined voltage is applied to the liquid crystal layer when lights that are polarized in a predetermined direction pass through the liquid crystal layer, a rotation degree of the liquid crystals in the liquid crystal layer is changed according to the voltage, and thus an amount of a beam that passes through the liquid crystal layer is changed according to the polarization status of the beam. As a result, brightness of the image that is displayed on the LCD panel can be adjusted by controlling the voltage that is applied to the liquid crystal layer.

In a case where at least two LCD panels are arranged, since the LCD uses the polarized beam, it is preferable that the LCD panels are arranged so that the two LCD panels cannot cancel the polarized lights, considering polarization directions of the polarizer that is provided in the respective LCD panels.

Figure 13:
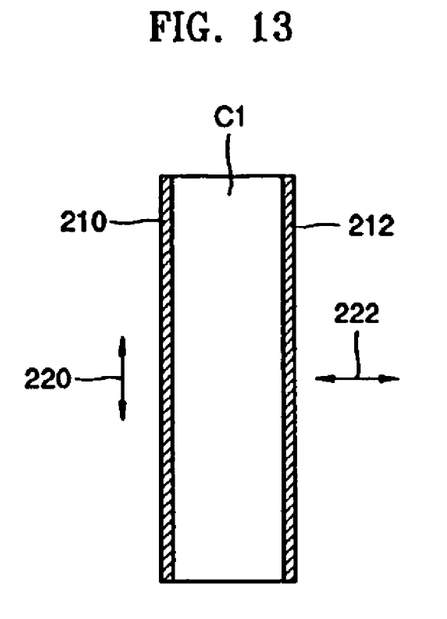
FIG. 13 is a sectional view of polarizations directions of first and second polarizers that are provided in the image display panel (LCD panel) of FIG. 10.
Figure 14:
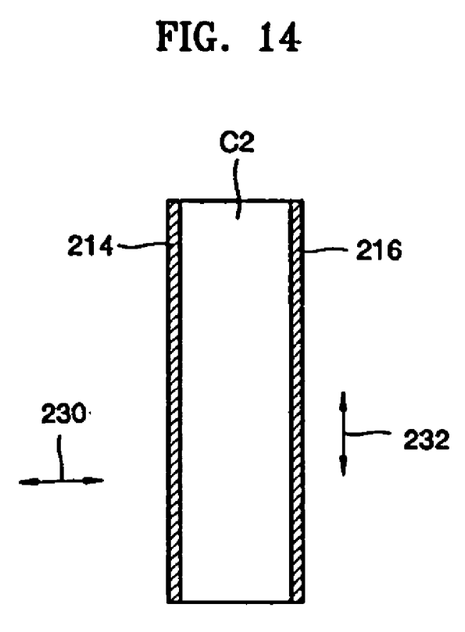
FIG. 14 is a sectional view of polarization directions of third and fourth polarizers that are provided in the parallax barrier plate (LCD panel) of FIG. 10.

FIG. 13 illustrates first and the second polarizers 210 and 212 and polarization directions thereof, and a first liquid crystal layer C1 that is interposed between the first and second polarizers 210 and 212. FIG. 14 illustrates third and fourth polarizers 214 and 216 and polarization directions thereof, and a second liquid crystal layer C2 that is interposed between the third and fourth polarizers 214 and 216, in a case where the parallax barrier plate 196 is a second LCD panel.

Referring to FIG. 13, the first polarizer 210 is provided in a front portion of the first LCD panel 192, that is, a portion to which the illuminating light is incident, and has a vertical polarization direction 220. The second polarizer 212 is provided in a rear portion of the first LCD panel 192, that is, a portion which is in contact with the third lenticular plate 190, and has a horizontal polarization direction 222. Accordingly, lights that pass through the first LCD panel 192 have the horizontal polarization direction 222. If the third polarizer 214 of the second LCD panel, which is used as the parallax barrier plate, has the vertical polarization direction, in an ideal case, the lights that pass through the first LCD panel 192 are not present in the second LCD panel. Thus, the second LCD panel in which the polarizer 214 has the vertical polarization direction cannot be used.

Therefore, it is preferable that the third polarizer 214 of the second LCD panel has the horizontal polarization direction 230 and the fourth polarizer 216 has the vertical polarization direction 232, as illustrated in FIG. 14.

Since the second LCD panel is used as the parallax barrier plate 196, areas corresponding to the first slits 200 (FIG. 11) or the second slits 202 (FIG. 12) must be formed at the second LCD panel according to the parallax method of the third lenticular plate 190.

In the second LCD panel, the areas corresponding to the first and second slits 200 and 202 are areas in which the horizontally polarized lights passing through the first LCD panel 192 can be passed without attenuation, and the remaining areas are areas in which the polarized lights cannot be passed. Accordingly, polarization status of the horizontally polarized lights that are incident to the first or second slits 200 or 202 are changed into the vertically polarized light, which is equal to the fourth polarizer 216, by applying a voltage only to the liquid crystal layer of the area corresponding to the first or second slits 200 or 202 of the second LCD panel. Voltage is not applied to the liquid crystal layer of the remaining areas except for the first or second slits 200 or 202. Thus, the polarized lights that that are incident to the remaining areas except for the first or second slits 200 or 202 are incident to the vertically polarized fourth polarizer 216 through the liquid crystal layer in the horizontally polarized status. As a result, only the lights that are incident to the areas corresponding to the first or second slits 200 or 202 in the second LCD panel pass through the second LCD panel, that is, the parallax barrier plate 196. The third lenticular plate 190 and the second LCD panel provide the full parallax.

As shown in FIGS. 13 and 14, the second polarizer 212 of the first LCD panel 192 and the third polarizer 214 of the second LCD panel (i.e., 196) have the same polarization status. Therefore, the lights that pass through the second polarizer 212 of the first LCD panel 192 and are polarized in the horizontal direction pass again through the third polarizer 214 of the second LCD panel, the polarization status of which is also horizontal. Thus, the third polarizer 214 may be removed from the second LCD panel.

Figure 15:
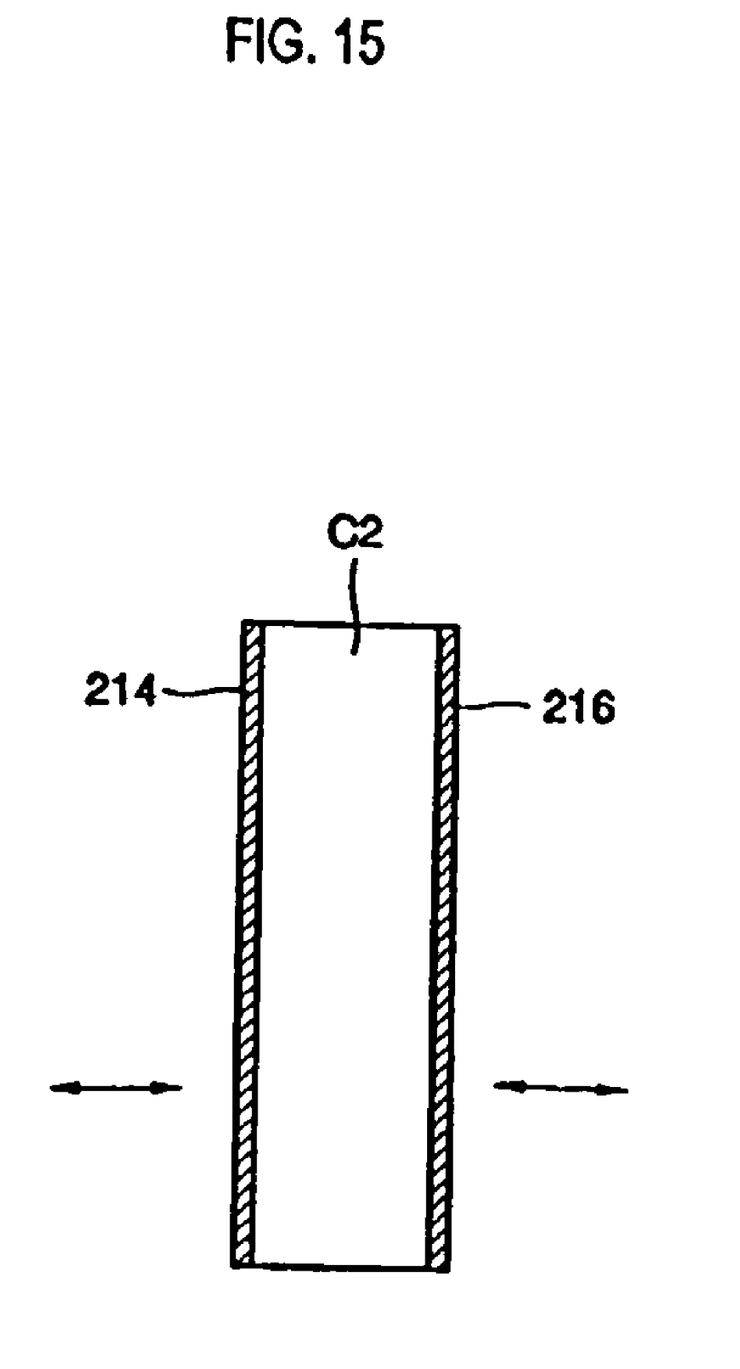
FIG. 15 is a sectional view of horizontal polarization directions of third and fourth polarizers that are provided in the parallax barrier plate (LCD panel) of FIG. 10.

Alternatively, polarizers having a horizontal polarization status can be used as the third and fourth polarizers 214 and 216 in the second LCD panel, as illustrated in FIG. 15. At this time, a voltage opposite to the above case will be applied.

Specifically, the lights that pass through the first LCD panel 192 are polarized in the horizontal direction, and the third and fourth polarizers 214 and 216 of the second LCD panel are also polarized in the horizontal direction. Therefore, in a case where a voltage is not applied to the liquid crystal layer of the second LCD panel, the lights that pass through the first LCD panel 192 pass through the second LCD panel as it is. In an aspect of the general inventive concept, voltage is applied to the liquid crystal layer of the remaining areas except for the areas corresponding to the first or second slits 200 or 202 in the second LCD panel, and the voltage is not applied to the liquid crystal layer of the areas corresponding to the first or second slits 200 or 202, so that the lights that pass through the first LCD panel 192 can pass through only the areas corresponding to the first or second slits 200 or 202 in the second LCD panel.

In a case where polarization status of the third polarizer 214 that is provided in the second LCD panel is the vertical direction, it is preferable that the first and second polarizers 210 and 212 of the first LCD panel 192 have polarization status opposite to the above case, and polarization status of the fourth polarizer 216 of the second LCD panel is the horizontal direction.

As described above, the 3D image displaying unit according to this embodiment includes an image display panel to display 2D or 3D image to the viewers. Also, predetermined optical plates to which the lights corresponding to the images displayed through the image display panel are incident, are provided behind the image display panel. The 3D image displaying unit according to various embodiments of the general inventive concept includes the first flat display panel, the optical plate, and the second flat display panel. The first flat display panel displays multi-viewpoint images when a 3D image is displayed and is transparent when a 2D image is displayed. The optical plate refracts the lights that are incident from the first flat display panel, and provides the parallax in a predetermined direction. The second flat display panel provides a parallax vertical to a parallax by the optical plate for lights passing through the optical plate when a 3D image is displayed and displays the corresponding 2D image when a 2D image is displayed.

The 3D image displaying unit according to the various embodiments of the general inventive concept can display a 2D image as well as a 3D image. Accordingly, the 3D image displaying unit according to the various embodiments can be applied to an image display unit of an image display apparatus to display 2D and 3D images.

The present general inventive concept can be applied to a 3D display in advertisement field, a household 3D multimedia video terminal, an image display terminal for simulation and education training, a visualization video terminal for various kinds of precise measurement and diagnosis, a 3D video terminal, a video terminal for surveillance and traffic control, a 3D video monitor for visual communicating conference and advertisement, a 3D TV for broadcasting, a video terminal for education and recreation, a terminal for various kinds of special environment creation, a video terminal for 3D games, a head up display for various kinds of airplanes and vehicles, and the like.

As an alternative of the first and/or second LCD panels as illustrated, other flat display devices, for example, a FED or an organic EL and a PDP, can be used.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A 3D image displaying unit in which 2D and 3D images are interchangeable, the 3D image displaying unit comprising:
   an image display panel which displays 2D or 3D images; and
   an optical plate provided behind the image display panel at a predetermined distance from the image display panel to refract an incident light to the image display panel, the optical plate including focuses at which the refracted light converges and from which diverging light is transmitted to the image display panel, wherein the predetermined distance is the distance required for the light diverging from the focuses to intersect with each other for the first time at the image display panel.

2. The 3D image displaying unit of claim 1, further comprising a parallax barrier plate arranged between the image display panel and the optical plate to prevent an image of the optical plate from being displayed on the image display panel.

3. The 3D image displaying unit of claim 2, wherein the parallax barrier plate is in contact with the optical plate.

4. The 3D image displaying unit of claim 1, wherein the optical plate is rotated by a predetermined angle.

5. The 3D image displaying unit of claim 1, wherein the image display panel is positioned in a virtual surface that includes points in which the light that pass through the focuses of the optical plate and diverges therefrom intersect with each other for the first time.

6. The 3D image displaying unit of claim 2, wherein the parallax barrier plate is provided at a position corresponding to the focuses of the optical plate.

7. The 3D image displaying unit of claim 3, wherein the parallax barrier plate is provided at a position corresponding to the focuses of the optical plate.

8. The 3D image displaying unit of claim 1, wherein the image display panel is a flat display panel.

9. The 3D image displaying unit of claim 2, wherein the image display panel is a flat display panel.

10. The 3D image displaying unit of claim 1, wherein the optical plate is an intersection lenticular plate including two lenticular plates having lenses or a micro lens array, the lenses included in the two lenticular plates being arranged so as to intersect perpendicular to each other and are in contact with each other.

11. The 3D image displaying unit of claim 2, wherein the optical plate is an intersection lenticular plate including two lenticular plates having lenses or a micro lens array, the lenses included in the two lenticular plates being arranged so as to intersect perpendicular to each other and are in contact with each other.

12. The 3D image displaying unit of claim 4, wherein the optical plate is an intersection lenticular plate including two lenticular plates having lenses or a micro lens array, the lenses included in the two lenticular plates being arranged so as to intersect perpendicular to each other and are in contact with each other.

13. The 3D image displaying unit of claim 2, wherein the parallax barrier plate is an LCD panel, a grid array plate, or a pinhole array plate, the LCD panel being transparent only at an area in which the lights converge.

14. The 3D image displaying unit of claim 3, wherein the parallax barrier plate is an LCD panel, a grid array plate, or a pinhole array plate, the LCD panel being transparent only at an area in which the lights converge.

15. A 3D image displaying unit in which 2D and 3D are interchangeable, the 3D image displaying unit comprising:

a first flat display device which displays a multi-viewpoint image where a 3D image is displayed, and is transparent where a 2D image is displayed;

an optical plate which refracts lights that are incident from the first flat display device and provides parallax in a predetermined direction, the optical plate including focuses at which the refracted lights converge and from which diverging lights are transmitted in the predetermined direction; and a display unit which provides the lights that pass through the optical plate with a parallax in a vertical direction to a parallax provided by the optical plate where the 3D image is displayed, and displays the corresponding 2D image where the 2D image is displayed, the display unit located at a predetermined distance from the optical plate required for the lights diverging from the focuses to intersect with each other for a first time at the display unit.

16. The 3D image displaying unit of claim 15, wherein the first flat display device is an LCD panel that includes first and second polarizers and a liquid crystal layer provided between the first and second polarizers, a polarization status of the first and second polarizers being opposite to each other.

17. The 3D image displaying unit of claim 15, wherein the optical plate is a lenticular plate.

18. The 3D image displaying unit of claim 15, wherein the display unit is second flat display device.

19. The 3D image displaying unit of claim 16, wherein the display unit is an LCD panel that includes third and fourth polarizers and a liquid crystal layer provided between the third and fourth polarizers, a polarization status of the third and fourth polarizers being equal to each other.

20. The 3D image displaying unit of claim 16, wherein the display unit is an LCD panel that is attached to the optical plate, the LCD panel including a liquid crystal layer and a polarizer having a polarization status equal to the first polarizers at a light emitting surface.

21. The 3D image displaying unit of claim 16, wherein the display unit is an LCD panel that includes two polarizers and a liquid crystal layer provided between the two polarizers, the two polarizers having a polarization status equal to each other.

* * * * *